June 21, 1966  W. H. HULTGREN  3,256,989

SCREW NECK FILTER CARTRIDGE

Filed March 13, 1963

INVENTOR.
WILLIAM H. HULTGREN
BY
Carlsen, Carlsen + Sturm
ATTORNEYS

United States Patent Office
3,256,989
Patented June 21, 1966

3,256,989
SCREW NECK FILTER CARTRIDGE
William H. Hultgren, Mount Carmel, Ill., assignor to Champion Laboratories, Inc., West Salem, Ill., a corporation of Connecticut
Filed Mar. 13, 1963, Ser. No. 264,920
5 Claims. (Cl. 210—130)

This invention relates generally to fluid filters and is more particularly directed to improvements in screw neck fluid filters.

In the prior art with which my invention is concerned, at least two classifications of the disposable type of filter cartridge are presently in use. These may be defined as the "spin-on" type of filter in which a centrally located screw threaded opening is provided for coaction with an adapter therefor and which provides the principal support for the filter cartridge on the apparatus with which it is designed to be used. In the other type of filter cartridge a relatively large, with respect to the diameter of the housing of a cartridge, screw threaded member is adapted to be inserted into an opening having similar threads thereon and the filter cartridge is supported substantially at its outer periphery. It may also be noted from a consideration of examples of these two types of disposable filter cartridge assemblies that the inlet and outlet port arrangements and the paths along which the fluid to be filtered will flow are substantially different. In the "spin-on" type of filters, the fluid to be filtered is introduced through ports spaced radially of the center axis of the filter and its mounting while in the screw neck type of filter cartridges the fluid to be filtered is introduced at the center of the cartridge and its mounting.

An example of the general type of disposable filters with which the present invention is concerned may be seen in the Humbert, Jr. et al. Patent No. 2,902,162 in which a typical prior art fluid filter construction is shown as an assembly made up of a number of elements which must be interconnected and interfitted to provide a complicated structure having the necessary mechanical stability for use in the applications that may be encountered.

As will become apparent from a consideration of my invention, I have provided an improved construction for a disposable screw neck filter cartridge which results in substantial reduction in manufacturing material costs and labor expenses for the assembly thereof.

It is therefore an object of my invention to provide a new and improved screw neck filter cartridge.

It is a further object of my invention to provide an improved screw neck disposable filter cartridge which may be easily and efficiently manufactured.

A still further object of my invention is to provide an improved screw neck disposable filter cartridge in which the filtering media is mounted upon and carried directly by a structural portion of the device. A further object of my invention is to provide an improved filter cartridge in which a mounting means for the filtering media serves as a structural portion of the filter cartridge assembly and further serves as a means for directing the flow of fluid to be filtered so that the incoming and outgoing flow of fluid is effectively separated.

Another object of my invention is to provide an improved screw neck disposable filter cartridge having a substantially reduced diameter of the filter casing with relation to the diameter of the screw neck portion.

The above noted objects are provided through the introduction of a filter assembly which has as an integral part thereof, a mounting member which serves the function of an end plate for closing and sealing the interior of the housing and as a rugged support member for the filter assembly.

These and other objects of my invention will become apparent from a consideration of the attached specification, claims and drawings, in which—

Figure 1:
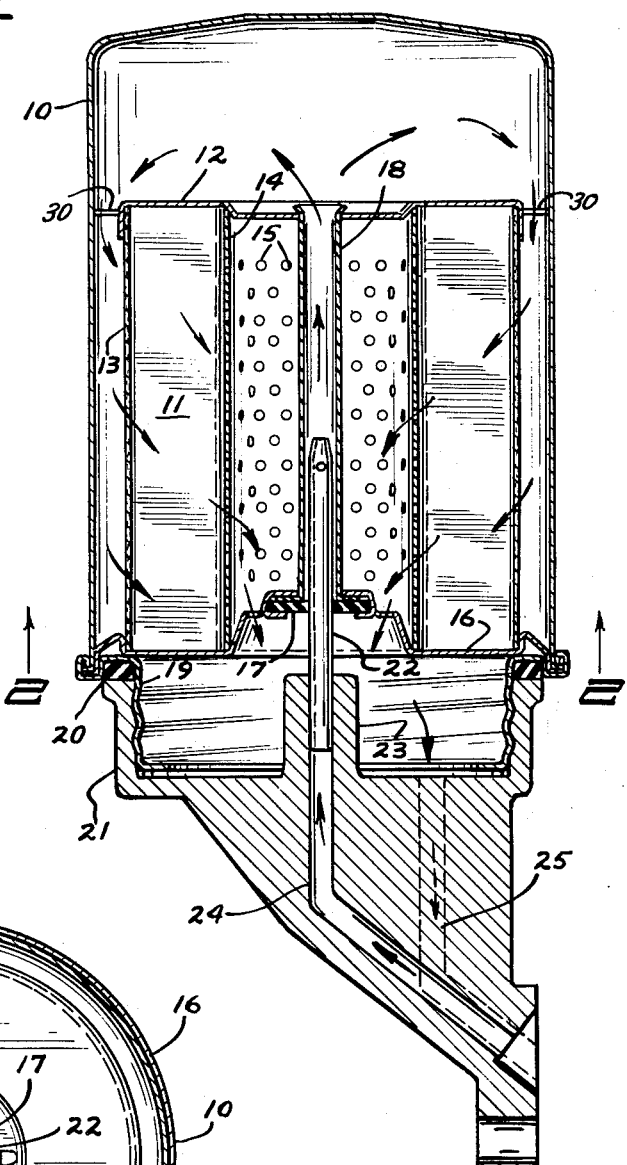
FIG. 1 is a side elevation sectional view of a screw neck filter cartridge assembly and mounting therefor.

Referring now to the drawing in which like elements have been identified with like reference characters, a disposable screw neck filter cartridge is shown in position on a mounting means 21 which is of conventional construction and is adapted to be mounted upon and coact with fluid passages on, for example, an internal combustion engine. Mounting 21 includes an inlet passage 24 and an outlet passage 25 which are in fluid communication with an upwardly extending central portion 23 and the surrounding annular portion, respectively, at the top end of mounting member 21. The inside of the outer periphery of the hollow annular portion of mounting member 21 is provided with suitable screw threads for coaction with a disposable screw neck filter cartridge assembly and the top surfaces of the outer periphery of the hollow annular section are designed to coact with the cartridge assembly to provide a fluid tight seal therewith.

Figure 3:
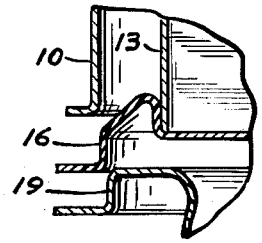
FIG. 3 is an enlarged broken away sectional drawing of the seal before the assembly has been completed.
Figure 4:
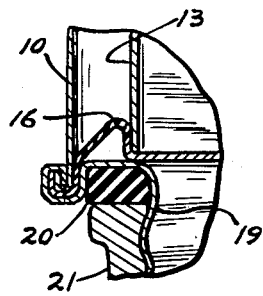
FIG. 4 is an enlarged sectional portion of the completed assembly seal.
Figure 2:
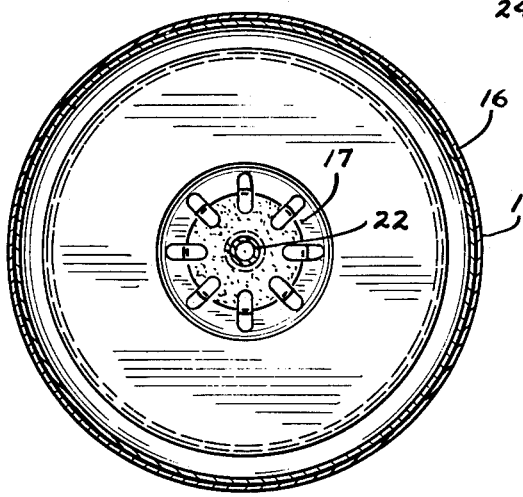
FIG. 2 is a sectional view of FIG. 1 taken along section line 2—2.

The filter cartridge assembly is comprised of an elongated hollow cylindrical member 10 which is open at the lower end and which may be drawn of suitable material, for example, thin sheet steel. A filter assembly, including lower plate member 16 and a screw threaded downwardly extending member 19 are attached to the opening in housing 10 by suitable means, for example welding, or as shown in the described embodiment a rolled seam effected by rolling the outwardly extending flange portions of the respective members and as indicated in FIGS. 3 and 4. An annular gasket member 20, comprised of suitable resilient material, is positioned around the periphery of screw threaded member 19 to provide an effective seal with mounting means 21. As may now be apparent from a consideration of the illustrated embodiment, screw threaded member 19 performs only the function of releasably engaging the hollow annular portion of mounting member 21. The outside diameter, with relation to the diameter of housing member 10, may be substantially the same and need only allow for the positioning of annular gasket member 20 so that the diameter of housing 10 may be reduced and the mechanical characteristics of member 19 need only be sufficient to provide an effective connection to the mounting member 21.

The filter assembly, which may be completely assembled before being placed in housing 10, includes, in addition to end plate member 16, a further end plate member 12 positioned at the top of the assembly, an annular accordion pleated filter element 13, a tube member 14 having perforations 15 therein and a centrally located continuous tube member 18. End plate member 16 is provided with an upwardly extending center portion having inclined walls and a plurality of annularly positioned openings formed by tab members which are bent to engage and hold a gasket member 17 which is adapted to coact with a fluid supply tube 22 mounted in central portion 23 on mounting member 21. Central tube 18 extends through an opening therefor in the center of end plate member 16 and is formed in such a manner to provide sealing engagement with the lower surface of end plate 16. The outer periphery of end plate 16 is provided with an inclined upwardly extending annular portion and extends at its outermost periphery into the rolled seal at the lower end of the assembled filter cartridge. Top end plate member 12 is provided with a downwardly extending circular portion at its center and may also include a plurality of annularly extending radially spaced portions 30 which may engage the inside of housing 10 to tend to prevent lateral displacement of the filter assembly during manufacture of the filter cartridge and under severe operating conditions. Central tube member 18 extends through an opening in the center of end plate 12 and is enlarged to provide a suitable engagement with member 12. Perforated tube member 14 extends between the center portions of end plates 12 and 16 and due to the inclined sidewalls of these portions is maintained in its desired substantially concentric position with respect to central tube member 18. An annular pleated filter member 13 is mounted concentrically of perforated tube member 14 and is sealingly attached to and mounted upon end plate members 12 and 16 through the use of a suitable adhesive which is comprised of a material having the necessary characteristics to prevent disassociation of the filter element 13 due to the characteristics of the fluid being filtered having a solvent and destructive action upon the adhesive material. The entire filter assembly 11 may then be placed in housing 10 along with member 19 and the seal formed to complete the unit.

It may be noted that the direction of fluid flow, as indicated by the plurality of arrows in FIG. 1, is upwardly from duct 24, through supply pipe 22, through central tube 18 and up into a chamber formed at the top end of the filter cartridge assembly. The fluid proceeds radially to the outside of the filtering material and then axially downwardly and radially inwardly to the inside of tube 14 and through the openings in end plate member 16 to the annular hollow portion on mounting 21 to fluid conduit 25. It will be noted that the chamber at the top end of the cartridge may be of size commensurate with the application for which the filter may be designed but in no event are axial spacers necessary between the top end plate 12 and the top end of housing 10 as the entire filter assembly 11 is supported from bottom end plate 16 which also provides the sealing member for the open end of housing 10.

It may also be appreciated that gasket member 17, which coacts to form a fluid seal with supply pipe 22, may also function as a pressure relief valve in the event the pressure within the filter cartridge assembly exceeds a predetermined pressure which will deform the center portion of gasket member 17 downwardly, thus relieving the excess pressure. It may also be appreciated that the various assemblies of which my filter cartridge is comprised may be simply dropped into place and a seal effected to complete the unit without requiring the use of spring loaded holding devices and the like to overcome the forces previously encountered in devices of the type with which my invention is concerned.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a screw neck fluid filter cartridge, the combination comprising:
   (a) an open ended cylindrical housing;
   (b) a first circular end plate member disposed intermediate the ends of said cylindrical housing, said member having a diameter less than the inside diameter of said cylindrical housing and having a centrally disposed opening therethrough;
   (c) a second circular end plate member fixedly secured on the open end of said cylindrical housing, said second member having an axially displaced peripheral portion adjacent to said housing to define a centrally disposed recess that is radially displaced from the inside of said cylindrical housing and a centrally disposed opening therethrough;
   (d) a screw threaded member fixedly secured on said second circular member and said housing;
   (e) a first tube member extending intermediate the centrally disposed openings in said first and second end plate members;
   (f) a second perforated tubular member having a diameter substantially larger than the diameter of said first tube member, disposed concentrically of said first tube member and intermediate said first and second end plate members; and
   (g) filtering media disposed concentrically outside of said second tube member, said filter media being continuous and in fluid sealing engagement with said first and second end plate members.

2. The subject matter of claim 1 in which a resilient annular gasket is disposed around the opening in the second end plate member, said gasket having a centrally disposed aperture for coaction with a fluid inlet tube adapted to extend thereinto so as to provide a pressure releasable fluid sealing engagement therewith.

3. The subject matter of claim 1 in which the radial periphery of the first end plate member includes a pluraliy of radially outwardly extending portions for slideably engaging the inside peripheral surfaces of the cylindrical housing.

4. A screw neck filter cartridge comprising in combination:
   (a) an open ended cylindrical housing;
   (b) a screw threaded member disposed on the open end of said housing and extending axially outwardly therefrom;
   (c) a first end plate member having a peripheral portion thereof disposed intermediate the open end of said cylindrical housing and said screw threaded member, said first end plate member including an axially displaced annular portion adjacent to the inside of said open ended cylindrical housing;
   (d) means interconnecting the peripheral portions of said screw threaded member and said first end plate member and the open end of said housing to fixedly secure said first end plate member on said housing;
   (e) an inlet tube member extending coaxially through said first end plate member and axially of the interior of said cylindrical housing;
   (f) a perforated tubular member disposed concentrically of said inlet tube member and substantially coextensive therewith axially into said cylindrical housing and intermediate said inlet tube member and said cylindrical housing;
   (g) an accordion pleated annular continuous filter disposed concentrically of said perforated tubular member, intermediate said perforated tubular member and said cylindrical housing;
   (h) a second end plate member having a centrally disposed opening surrounding said inlet tube member and being in engagement with said perforated tubular member and the one end of said filter and further being disposed intermediate the ends of said cylindrical housing; and (i) means fixedly securing the ends of said filter to said first and second end plate members.

5. The subject matter of claim 4 in which the periphery of the second end plate member has a plurality of radially outwardly extending portions for slideably engaging the inside walls of the cylindrical housing.

References Cited by the Examiner

UNITED STATES PATENTS

| | | | |
|---|---|---|---|
| 2,734,636 | 2/1956 | Foster | 210—443 |
| 2,902,162 | 9/1959 | Humbert et al. | 210—443 |
| 3,000,506 | 9/1961 | Hultgren | 210—136 |

REUBEN FRIEDMAN, *Primary Examiner.*

F. SPEAR, *Assistant Examiner.*